(12) United States Patent
Emmann et al.

(10) Patent No.: US 6,508,141 B1
(45) Date of Patent: Jan. 21, 2003

(54) BRAKE-POWER PROPORTIONING MECHANISM FOR A MANUALLY ACTUATED PARKING-BRAKE SYSTEM COMPRISING A MULTI-PIECE LEVER MECHANISM

(75) Inventors: Siegfried Emmann, Weinstradt (DE); Christian Mosler, Stuttgart (DE); Werner Spielmann, Burgstetten (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/673,315
(22) PCT Filed: Mar. 29, 1999
(86) PCT No.: PCT/EP99/02144
§ 371 (c)(1),
(2), (4) Date: Jan. 5, 2001
(87) PCT Pub. No.: WO99/54180
PCT Pub. Date: Oct. 28, 1999

(30) Foreign Application Priority Data

Apr. 16, 1998 (DE) .......................... 198 16 800

(51) Int. Cl.[7] ................................. F16C 1/10
(52) U.S. Cl. .................. 74/500.5; 74/501.5 R; 74/505; 74/501.6; 74/502.2; 188/2
(58) Field of Search .................. 74/500.5, 501.5 R, 74/505, 501.6, 502.2; 188/2

(56) References Cited

U.S. PATENT DOCUMENTS

| | | | | |
|---|---|---|---|---|
| 4,054,187 A | * | 10/1977 | Sbarro | 188/16 |
| 5,540,304 A | * | 7/1996 | Hawkins et al. | 188/2 D |
| 5,690,193 A | * | 11/1997 | Baumann et al. | 188/72.9 |
| 5,769,189 A | * | 6/1998 | Heibel et al. | 188/106 P |

FOREIGN PATENT DOCUMENTS

| | | |
|---|---|---|
| DE | 355153 | 6/1922 |
| DE | 33 22 436 A1 | 7/1988 |
| DE | 44 01 084 C1 | 1/1994 |
| DE | 197 33 552 A1 | 8/1997 |

\* cited by examiner

Primary Examiner—David A. Bucci
Assistant Examiner—Julie K Smith
(74) Attorney, Agent, or Firm—Crowell & Moring LLP

(57) ABSTRACT

In a brake-force splitting gear for a manually actuated parking-brake system in a motor vehicle, brake force is transmitted via cable assemblies both to a wheel brake or shaft brake on the vehicle transmission and to wheel brakes of at least one driven vehicle axle. The wheel brakes of each vehicle axle being articulated in each case via a differential element mounted in a housing or frame. The splitting gear includes a lever mechanism comprising at least two balance beams or levers which split the brake force between the transmission brake and wheel brakes.

9 Claims, 1 Drawing Sheet

BRAKE-POWER PROPORTIONING MECHANISM FOR A MANUALLY ACTUATED PARKING-BRAKE SYSTEM COMPRISING A MULTI-PIECE LEVER MECHANISM

The invention relates to a brake-force split gear for a parking-brake system operated by muscular power and belonging to a motor vehicle, in which the brake force is transmitted via cable assemblies both to a wheel brake or shaft brake on the vehicle transmission and to wheel brakes of at least one driven vehicle axle, the wheel brakes of each vehicle axle being articulated in each case via a differential element mounted in a housing or frame, and the split gear being a lever mechanism comprising at least one balance beam which splits the brake force between the transmission brake and wheel brakes.

A brake-force split gear of this type is known from DE 197 33 552.7 which is not a prior publication. A lever mechanism is described there, which is arranged on a housing and comprises both an operating lever and a balance beam. The operating lever and the balance beam are coupled to one another via a pivoting joint. A differential element together with the wheel-brake cable assembly is mounted in an articulated manner at one end of the balance beam, whilst the transmission-brake cable assembly is suspended at the other end. The entire mechanism is arranged in and on a housing in front of the rear vehicle axle and between the vehicle frame. By virtue of the lever arrangement, the operating cable assembly articulates the housing eccentrically, as seen in the top view. Consequently, a cable assembly led in a protective tube is necessary for operating the parking-brake system, so that the split gear can be used both in a vehicle with left-hand rive and in a vehicle with right-hand drive.

The problem on which the invention is based is, therefore, to provide a brake-force split gear which ensures a sufficient engaging action on a road with unequal grip, even in the event of a failure of part of the brake system. The split gear is to be designed as a module, along with a low construction-space requirement, a low outlay in terms of maintenance and simple adjustability, and is to require the same components both for a vehicle with right-hand drive and for a vehicle with left-hand drive.

The problem is solved by means of the features of the main claim. The differential element arranged in the housing or frame is mounted on a lever in the region between the ends of the latter. The lever is pivotably fixed at one end to the housing or frame and is suspended at the other end in a lever-mechanism cable. The lever-mechanism cable and the cable assembly leading to the transmission brake are articulated on the balance beam which, if appropriate, is positioned at a distance, an articulation point for the operating cable or an operating element being located in the region between the articulation points for the lever-mechanism cable and the transmission-brake cable assembly.

The brake-force split gear splits the brake operating force via the balance beam and the cable assemblies in such a way that the braking action of the wheel brakes sufficiently conforms to the legal and/or factory standard for the braking action on a road with unequal grip. In this case, a large proportion of the brake operating force is allocated to the highly effective transmission brake. If, for example, dual power brakes are used for the transmission brake and the parking brakes of the wheels, then, for example, each wheel brake of an axle receives 35% and the transmission brake 30% of the operating force. The combination of transmission and wheel brakes also makes it possible still to have a high braking action on a road with unequal grip even in the event of a failure of one wheel brake. If, for example, the wheel having the failed parking brake stands on a smooth icy surface, the wheel standing on a road section with good grip prevents the vehicle from slipping away in spite of a considerable loss of brake force. This is because the transmission brake, jointly with the parking brake with is still working, locks the axle differential, so that the engaging of the wheel standing on the icy surface takes place via the differential due to the locking of the wheel standing on the road section with good grip. The wheel standing on the icy surface cannot rotate and therefore cannot even begin to roll at all.

These and other objects and advantages are achieved by the brake force splitting gear according to the invention, in which the differential element arranged in the housing or frame is mounted on a lever in the region between the ends of the latter. The lever is pivotally fixed at one end to the housing or frame and is suspended at the other end in a lever-mechanism cable. The lever-mechanism cable and the cable assembly leading to the transmission brake are articulated on the balance beam which, if appropriate, is positioned at a distance, and an articulation point for the operating cable or an operating element is located in the region between the articulation points for the lever-mechanism cable and the transmission-brake cable assembly.

Further details of the invention may be gathered from the uncited or only partially cited subclaims and from the following description of a diagrammatically illustrated embodiment:

Figure 1:
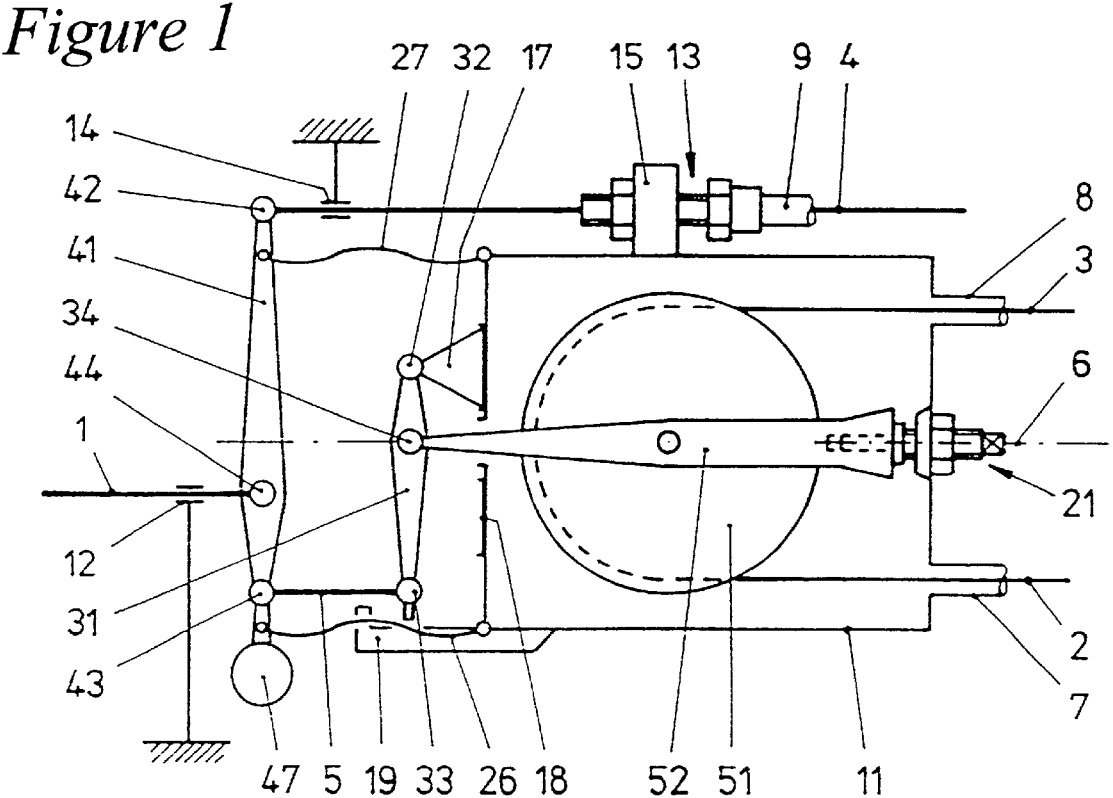
FIG. 1 shows a brake-force split gear.

FIG. 1 shows a brake-force split gear which is arranged on the motor vehicle between an operating element operated by muscular power and the various brakes which can engage for parking. A cable assembly (1) comes from the operating element, not illustrated, and splits the muscular power between the cable assemblies (2, 3, 4) via a balance beam (41) and a lever (31). The cable assemblies (2–4) are led, downstream of the lever mechanism, in protective tubes (7–9) which are supported on a housing (11) arranged fixedly on the motor vehicle. The protective tube (9) terminates at the housing (11) in an adjusting device (13). The latter is, for example, a short tubular piece supporting the protective tube (9), with an outer hexagon and with an external thread. Said tubular piece is screwed into threaded bores on the housing or, as here, on a separate carrier (15) and is locked by means of a nut.

A lever (31) is articulated on the housing (11) in a bearing pedestal (17). The lever (31) has at one end an articulation point (32) and at the other end an articulation point (33), the lever-mechanism cable (5) which operates the lever (31) being suspended at the latter articulation point. The lever (31) has, in the region between the articulation points (33) and (32), an articulation point (34), via which it is connected to the differential element (51). The differential element, which here is, for example, a differential roller (51), is mounted in an articulated manner at the articulation point (34) via a roller carrier (52). The cable assemblies (2) and (3) are, in the exemplary embodiment, parts of a wire cable which loops around the differential roller (51) over approximately 180°.

The lever-mechanism cable (5) and the cable assembly (4) are suspended on the balance beam (41). For this purpose, the balance beam (41) has the articulation points

(43) and (42). Located on the balance beam in the region between these two articulation points is a further articulation point (44). The operating cable (1) is suspended at the latter. The balance beam (41) splits the engaging force introduced into the articulation point (44) between the cable assembly (4) leading to the transmission brake and the lever (31) together with the differential element (51) carrying and/or deflecting the wheel-brake cable assemblies (2) and (3).

In order to step up the muscular power operating the parking brakes, the lever length between the articulation points (42) and (44) is greater than the lever length between the articulation points (43) and (44). The lever ratios on the balance beam (41), on the lever (31) and on the levers or operating elements, not illustrated, of the transmission brake and of the wheel brakes are coordinated with one another in such a way that the wheel brakes have allocated to them approximately 70±10% of the parking force. In this case, it may be necessary for the cable assembly (4) leading to the transmission brake not to terminate directly at the articulation point (42), but via an intermediate cable. The intermediate cable acts on a lever which is supported on the housing (11) and in which the cable assembly (4) is suspended for the further step-up of the operating force.

The balance beam (41) is seated in front of the housing (11) as seen in the direction of travel. It is arranged, as a rule, between the two frame side members of the vehicle chassis. In order to minimize or avoid an oscillation of the balance beam (41) suspended freely between the cables or cable assemblies (1), (4) and (5), inter alia the cable (1) and the cable assembly (4) are guided in the lugs (12) and (14) fastened to the vehicle body.

In addition, in the exemplary embodiment, the balance beam (41) is equipped with a differential weight (47) in the region of the articulation point (43), so that the beam has approximately the same mass on the right and left of the cable (1). This prevents the occurrence of a pendulum oscillation which twists the cable (1). Instead of the differential weight (47), the balance beam (41) may have a shape which makes it possible to have a substantially comparable mass on the right and left of the axis of oscillation. if appropriate, for damping purposes, the balance beam (41) may also rest, at least partially, on a guide or the like.

Figure 2:
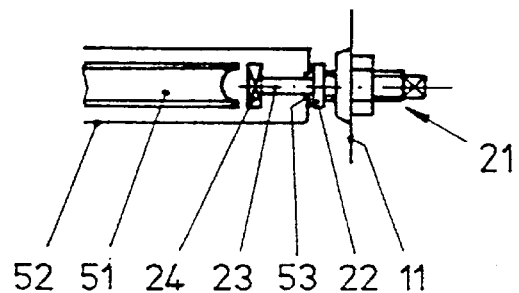
FIG. 2 shows an adjusting device for the differential element.

So as not to risk the failure of the entire parking-brake system as a result of a tilting of the balance beam (41) if the wire cable of the cable assemblies (2) and (3) breaks, for example a butting and adjusting screw (21) is screwed to the housing (11) and locked, cf. FIG. 2. The screw (21) has a three-part head. Directly adjoining the thread is an adjusting collar (22), against the end face of which the roller carrier (52) bears adjustably, when the parking brake is not operated. The adjusting collar (22) has adjoining it a shank (23) which merges into a butting bar (24). The latter has two plane side faces, the distance between which corresponds to the diameter of the shank (23). During assembly, the butting bar (24) is inserted through a long hole (53) present in the roller carrier (52) and is positioned in a screw-in position such that it intersects the long hole (53). The screw-in depth in the housing (11) depends on the adjustment position of the adjusting collar (22).

If a cable assembly (2) and/or (3) breaks, when the parking brake is operated the roller carrier (52) comes to bear against that bar portion of the butting bar (24) which projects beyond the shank (23), thus preventing the lever (31) and the balance beam (41) from pivoting in an uncontrolled manner, so that at least the transmission brake remains operable. The screw (21), which, for adjustment through 180° in each case, carries a square piece at its free end, also changes the butting position as a result of adjustment. The overall stroke of the roller carrier in this case remains constant.

The wire cable forming the cable assemblies (2, 3) is fastened to the differential roller (51) if appropriate, approximately over half the looping distance. In this case, the pivot angle of the differential roller (51) in relation to the roller carrier (52) is additionally limited mechanically, so that, if a cable assembly (2) or (3) breaks, the other cable assembly, which is unbroken, is held and it is still possible to engage a wheel brake for parking. Alternatively to the butting screw (21), the pivoting distance of the lever (31) may also be limited by a stop (19) fastened to the housing (11).

So that at least the transmission brake can still be operated if the lever-mechanism cable (5) and/or the cable of the cable assemblies (2) and (3) breaks, a securing cable (26) is arranged between the housing (11) and the balance beam (41) in the region of the articulation point (43). For example, if the lever-mechanism cable (5) breaks, the securing cable (26) is tensioned. When the cable (1) is operated, the balance beam (41) is then pivoted approximately about the articulation point (43) and the cable assembly (4) is subjected to tensile load.

In order to continue to ensure that the wheel brakes are engaged for parking if the transmission-brake cable assembly (4) breaks, the balance beam (41) is articulated on the housing (11) via a securing cable (27), for example in the region of the articulation point (42), so that the balance beam (41) cannot tilt away anti-clockwise.

During normal operation, the securing cables (26) and (27) are laid loosely such that they do not impair the normal functioning of the parking-brake system.

In addition, in the representative embodiment, the balance beam 41 is equipped with a differential weight 47 in the region of the articulation point 43, so that the beam has approximately the same mass on the right and left of the cable 1. This prevents the occurrence of a pendulum oscillation which twists the cable 1. Instead of the differential weight 47, the balance beam 41 may have a shape which makes it possible to have a substantially comparable mass on the right and left of the axis of oscillation. If appropriate, for damping purposes, the balance beam 41 may also rest, at least partially, on a guide or the like.

The running eccentrically operating cable (1) then lies on the other side of the vehicle central line (6), so that, in the driver's cab of a vehicle with right-hand drive as well, it terminates at the operating element of the parking-brake system without additional cable deflections.

What is claimed is:

1. Brake-force splitting gear for a manually operated parking-brake system in a motor vehicle, in which brake force is transmitted via cable assemblies both to a wheel brake or shaft brake on the vehicle transmission and to wheel brakes of at least one driven vehicle axle, the wheel brakes of respective vehicle axles being articulated via a differential element mounted in a housing or frame, and the splitting gear including a lever mechanism comprising at least one balance beam which splits the brake force between the transmission brake and wheel brakes, wherein:

the differential element is coupled to a lever, which is articulated at one end on the housing and suspended at the other end on a lever-mechanism cable;

the lever-mechanism cable and a transmission-brake cable assembly leading to the transmission brake are articulated on the balance beam; and an articulation point for an operating cable which transmits braking force to the splitting gear is located on the balance beam, in a region between the articulation points for the lever-mechanism cable and the transmission-brake cable assembly.

2. The brake-force splitting gear according to claim 1, wherein the balance beam is separated in space from the gear housing and the lever, the distance between the balance beam and the lever being at least 0.4 meters.

3. The brake-force splitting gear according to claim 1, wherein the balance beam is connected in the region of its extremities to the housing via securing cables, which are not tensioned during normal operation.

4. The brake-force splitting gear according to claim 1, wherein the operating cable is guided, in the direction of travel, in front of the balance beam in a lug supported on the vehicle body.

5. The brake-force splitting gear according to claim 1, wherein the transmission-brake cable assembly is guided, in the direction of travel, behind the balance beam in a lug supported on the vehicle body.

6. The brake-force splitting gear according to claim 1, wherein, in the case of lever portions of different length between the articulation point for the operating cable and the respective articulation points for the lever-mechanism cable and the transmission-brake cable assembly the balance beam carries a differential weight in the region of the free end of the shorter or lighter lever portion.

7. The brake-force splitting gear according to claim 1, wherein the lever portions of the balance beam are balanced with respect to a horizontal pivot axis oriented approximately parallel to a longitudinal direction of the vehicle and intersecting the articulation point.

8. The brake-force splitting gear according to claim 1, wherein the lever portions of the balance beam are balanced with respect to a horizontal pivot axis oriented approximately parallel to a longitudinal direction of the vehicle and intersecting the articulation point.

9. Brake-force splitting gear for transmitting braking force in a vehicle, from an input mechanism differentially to a transmission brake and to wheel brakes, said splitting gear comprising:

a differential element coupled to transmit differentially to said wheel brakes, a braking force input thereto;

a lever arm which is pivotably coupled at a first end thereof on a housing fixed to the vehicle, and is suspended at a second end thereof on a lever mechanism cable, said differential element being pivotally coupled to said lever arm at a point intermediate the first and second ends thereof, for transmission of braking force to the differential element;

a balance beam having the lever mechanism cable articulated at a first end thereof and a cable assembly for transmitting braking force to the transmission brake articulated at a second end thereof; and an articulation point for coupling said input mechanism on said balance beam, at a point situated intermediate said first and second ends.

* * * * *